US012612536B2

(12) United States Patent
Matsumura et al.

(10) Patent No.: US 12,612,536 B2
(45) Date of Patent: Apr. 28, 2026

(54) BIAXIALLY STRETCHED POLYESTER FILM

(71) Applicant: TOYOBO CO., LTD., Osaka (JP)

(72) Inventors: Mei Matsumura, Tsuruga (JP); Akira Shimizu, Tsuruga (JP)

(73) Assignee: TOYOBO CO., LTD., Osaka (JP)

( * ) Notice: Subject to any disclaimer, the term of this patent is extended or adjusted under 35 U.S.C. 154(b) by 391 days.

(21) Appl. No.: 18/257,987

(22) PCT Filed: Dec. 17, 2021

(86) PCT No.: PCT/JP2021/046719

§ 371 (c)(1),
(2) Date: Jun. 16, 2023

(87) PCT Pub. No.: WO2022/131360

PCT Pub. Date: Jun. 23, 2022

(65) Prior Publication Data

US 2024/0052205 A1 Feb. 15, 2024

(30) Foreign Application Priority Data

Dec. 18, 2020 (JP) ................................. 2020-210518

(51) Int. Cl.
| | |
|---|---|
| *C09J 7/25* | (2018.01) |
| *B32B 27/36* | (2006.01) |
| *C09J 7/29* | (2018.01) |
| *G02B 1/04* | (2006.01) |

(52) U.S. Cl.
CPC .............. *C09J 7/255* (2018.01); *B32B 27/36* (2013.01); *C09J 7/29* (2018.01); *G02B 1/04* (2013.01); *C09J 2203/326* (2013.01); *C09J 2203/334* (2013.01); *C09J 2301/162* (2020.08); *C09J 2467/006* (2013.01)

(58) Field of Classification Search
CPC ........ C09J 7/255; C09J 7/29; C09J 2203/326; C09J 2203/334; C09J 2301/162; C09J 2467/006; B32B 27/36; G02B 1/04
See application file for complete search history.

(56) References Cited

U.S. PATENT DOCUMENTS

| | | |
|---|---|---|
| 2005/0118442 A1 | 6/2005 | Itoh et al. |
| 2007/0026223 A1 | 2/2007 | Osada et al. |
| 2010/0021731 A1* | 1/2010 | Nomura ................ B32B 37/144 |
| | | 156/60 |
| 2010/0307570 A1* | 12/2010 | Aoyama .................... C08J 5/18 |
| | | 362/311.03 |
| 2013/0089730 A1 | 4/2013 | Kawasaki et al. |
| 2023/0113079 A1 | 4/2023 | Araki et al. |

FOREIGN PATENT DOCUMENTS

| | | |
|---|---|---|
| CN | 1615334 A | 5/2005 |
| JP | S55-069620 A | 5/1980 |
| JP | H05-339476 A | 12/1993 |
| JP | H08-244112 A | 9/1996 |
| JP | H09-295344 A | 11/1997 |
| JP | H11-105129 A | 4/1999 |
| JP | 2005-288996 A | 10/2005 |
| JP | 2014-043571 A | 3/2014 |
| JP | 2018-028075 A | 2/2018 |
| JP | 2020-063399 A | 4/2020 |
| KR | 10-2013-0085940 A | 7/2013 |
| WO | WO 2004/108408 A1 | 12/2004 |
| WO | WO 2021/200754 A1 | 10/2021 |

OTHER PUBLICATIONS

European Patent Office, Extended European Search Report in European Patent Application No. 21906718.8 (Oct. 7, 2024).
Japanese Patent Office, International Search Report in International Patent Application No. PCT/JP2021/046719 (Feb. 22, 2022).

\* cited by examiner

*Primary Examiner* — Blaine Copenheaver
(74) *Attorney, Agent, or Firm* — Leydig, Voit & Mayer, Ltd.

(57) ABSTRACT

Provided is a polyester film that is excellent in stiffness and transparency, and that is suitable for producing molded articles, labels, optical films, and the like. A biaxially stretched polyester film comprises a polyester resin (I) comprising terephthalic acid and ethylene glycol as main constituent components, the polyester resin (I) having a recrystallization temperature obtained by DSC of 160° C. or more and 193° C. or less, the polyester resin (I) being contained in an amount of 60 mass % or more based on 100 mass % of the entire film, the film having a tensile modulus of elasticity of 3200 MPa or more both in a longitudinal direction and a width direction, and the total tensile modulus of elasticity in the longitudinal direction and the width direction being 7000 MPa or more.

13 Claims, No Drawings

BIAXIALLY STRETCHED POLYESTER FILM

TECHNICAL FIELD

The present invention relates to a biaxially stretched polyester film. Further, the present invention relates to a label film, a diffusion film for display, and a lens film for display, each having the biaxially stretched polyester film.

BACKGROUND ART

Biaxially stretched polyester films, typified by polyethylene terephthalate (PET) films, are used in a wide range of fields, such as magnetic tapes, insulating tapes, photographic films, tracing films, packaging materials, printed labels, electrically insulating materials, information recording materials, various process papers, and optical materials, because of their excellent transparency, dimensional stability, mechanical properties, electrical properties, chemical resistance, and the like (e.g., PTL 1 and PTL 2). In these applications, strength, elasticity, and other mechanical characteristics are very important properties. For example, insufficient strength causes problems such as breakage in a later processing step. An insufficient modulus of elasticity is considered to cause problems such as a decrease in stiffness, deflection of films, poor transportability, and a decrease in printability.

CITATION LIST

Patent Literature

PTL 1: JP2020-63399A
PTL 2: JP2018-28075A

SUMMARY OF INVENTION

Technical Problem

As a measure for improving the modulus of elasticity, which is important in mechanical characteristics, the present inventors focused on methods such as adjusting the draw ratio and increasing crystallinity. However, if the draw ratio is simply increased, although the modulus of elasticity is improved, there is increasing concern that film formability is reduced due to breakage. Further, there is a method of increasing the ratio of only one of the two axes; however, the modulus of elasticity of the other axis is reduced, resulting in a highly anisotropic film.

On the other hand, in order to increase crystallinity, it is necessary to sufficiently perform heat treatment. However, a longer treatment time caused a disadvantage that the time required for production increased, and when the treatment was performed at a high temperature, there were problems, i.e., formation of oligomers, whitening, and embrittlement.

The present invention has been made against the background of such problems in the prior art. That is, an object of the present invention is to provide a polyester film that is more excellent in stiffness and transparency than conventional polyester films, and that is suitable for producing molded articles, labels, optical films, and the like.

Solution to Problem

As a result of intensive study to achieve this object, the present inventors have completed the present invention. Specifically, the present invention provides the following inventions.

1. A biaxially stretched polyester film comprising a polyester resin (I) comprising terephthalic acid and ethylene glycol as main constituent components, the polyester resin (I) having a recrystallization temperature obtained by DSC of 160° C. or more and 193° C. or less, the polyester resin (I) being contained in an amount of 60 mass % or more based on 100 mass % of the entire film, the film having a tensile modulus of elasticity of 3200 MPa or more both in a longitudinal direction and a width direction, and the total tensile modulus of elasticity in the longitudinal direction and the width direction being 7000 MPa or more.

2. In an embodiment, in the biaxially stretched polyester film of the present invention, the ethylene glycol or terephthalic acid or an ester-forming derivative thereof is derived from a biomass resource.

3. In an embodiment, the present invention provides a biaxially stretched polyester film having an easy-to-adhere layer on at least one surface of the above biaxially stretched polyester film.

4. In another embodiment, the present invention provides a label film having an adhesive layer on at least one surface of the above biaxially stretched polyester film.

5. In an embodiment, the present invention provides a biaxially stretched polyester film having a coating layer of a UV curing resin on at least one surface of the above biaxially stretched polyester film.

6. In another embodiment, the present invention provides a diffusion film for display having the above biaxially stretched polyester film.

7. In another embodiment, the present invention provides a lens film for display having the above biaxially stretched polyester film.

Since the biaxially stretched polyester film of the present invention contains a polyester resin having a recrystallization temperature in a specific range, the mechanical characteristics of the film can be improved while maintaining transparency.

Advantageous Effects of Invention

According to the present invention, it is possible to obtain a polyester film that is more excellent in stiffness and transparency than conventional polyester films, and that is suitable for producing molded articles, labels, optical films, and the like.

DESCRIPTION OF EMBODIMENTS

The present invention is described in detail below. According to the present invention, a polyester film that is excellent in stiffness (elasticity) and that is suitable for producing molded articles, labels, optical films, and the like is provided. Further, the present invention relates to a polyester film comprising, as a raw material, a polyester resin (I) polymerized from a plant-derived ethylene glycol component.

The present invention provides a biaxially stretched polyester film comprising a polyester resin comprising terephthalic acid and ethylene glycol as main constituent components, the polyester resin having a recrystallization temperature obtained by DSC of 160° C. or more and 193° C. or less,

the polyester resin being contained in an amount of 60 mass % or more based on 100 mass % of the entire film, the film having a tensile modulus of elasticity of 3200 MPa or more both in a longitudinal direction and a width direction, and the total tensile modulus of elasticity in the longitudinal direction and the width direction being 7000 MPa or more.

The present invention having such characteristics can improve the modulus of elasticity, which is important in mechanical characteristics. In addition, the present invention can achieve an effect of improving the modulus of elasticity and avoiding a decrease in film formability due to breakage, which have been conventionally difficult, in a well-balanced manner. In addition, the present invention can prevent the anisotropy from becoming very large. Further, it is possible to suppress the formation of oligomers, whitening, and embrittlement after heat treatment.

Polyester Film

The polyester film of the present invention may be a film having a single-layer structure containing at least a polyester resin (I), or may be a film having a multilayer structure when two or more polyester resins are used. In this embodiment, the present invention comprises at least a polyester resin (I).

The polyester film of the present invention comprises a polyester resin (I) comprising terephthalic acid and ethylene glycol as main constituent components, and the polyester resin (I) has a recrystallization temperature obtained by DSC of 160° C. or more and 193° C. or less.

In an embodiment, the polyester film of the present invention can contain, in addition to the polyester resin (I), at least one polyester resin (II) that can be produced by polycondensation of a dicarboxylic acid component containing aromatic dicarboxylic acid or an ester-forming derivative thereof as a main component and a diol component containing ethylene glycol as a main component in the presence of at least an antimony compound and a phosphorus compound through an esterification reaction or a transesterification reaction.

In the present invention, the polyester resin (II) refers to a polyester resin having a recrystallization temperature obtained by DSC different from that of the polyester resin (I) according to the present invention, for example, less than 160° C. or more than 193° C.

Examples of the aromatic dicarboxylic acid or an ester-forming derivative thereof in the polyester resin (I) of the present invention include terephthalic acid.

Further, examples of the aromatic dicarboxylic acid or an ester-forming derivative thereof in the polyester resin (II) include the following. Specific examples include terephthalic acid, phthalic acid, isophthalic acid, dibromoisophthalic acid, sodium sulfoisophthalate, phenylenedioxydicarboxylic acid, 4,4'-diphenyldicarboxylic acid, 4,4'-diphenyletherdicarboxylic acid, 4,4'-diphenylketonedicarboxylic acid, 4,4'-diphenoxyethanedicarboxylic acid, 4,4'-diphenylsulfonedicarboxylic acid, and 2,6-naphthalenedicarboxylic acid; alkyl esters having about 1 to 4 carbon atoms of these aromatic dicarboxylic acids, such as terephthalic acid dimethyl ester and 2,6-naphthalenedicarboxylic acid dimethyl ester; halides thereof; and the like. Preferred among these is terephthalic acid, 2,6-naphthalenedicarboxylic acid, or an alkyl ester thereof, and particularly preferred is terephthalic acid.

Examples of the diol component other than ethylene glycol include aliphatic diols, such as trimethylene glycol, tetramethylene glycol, pentamethylene glycol, hexamethylene glycol, octamethylene glycol, decamethylene glycol, neopentyl glycol, 2-ethyl-2-butyl-1,3-propanediol, diethylene glycol, polyethylene glycol, and polytetramethylene ether glycol; alicyclic diols, such as 1,2-cyclohexanediol, 1,4-cyclohexanediol, 1,1-cyclohexanedimethylol, 1,4-cyclohexanedimethylol, and 2,5-norbornanedimethylol; aromatic diols, such as xylylene glycol, 4,4'-dihydroxybiphenyl, 2,2-bis(4'-hydroxyphenyl)propane, 2,2-bis(4'-hydroxyethoxyphenyl)propane, bis(4-hydroxyphenyl)sulfone, and bis(4-β-hydroxyethoxyphenyl)sulfonic acid; ethylene oxide adducts or propylene oxide adducts of 2,2-bis(4'-hydroxyphenyl)propane; and the like.

The polyester resin (I) of the present invention can be produced by subjecting the aromatic dicarboxylic acid or the ester-forming derivative thereof to a polycondensation reaction through an esterification reaction or a transesterification reaction between a dicarboxylic acid component that accounts for 50 mol % or more, preferably 90 mol % or more, more preferably 95 mol % or more, and particularly preferably 99 mol % or more of the dicarboxylic acid component, and a diol component in which ethylene glycol accounts for 50 mol % or more, preferably 90 mol % or more, more preferably 95 mol % or more, and particularly preferably 97 mol % or more of the diol component.

Diethylene glycol produced as a by-product in the reaction system may be copolymerized, and the content of diethylene glycol, including a component added from the outside of the system as a copolymerization component, is preferably 5 mol % or less. If the content of diethylene glycol is large, the degree of suppression of the elution amount of antimony as the polyester resin (I) tends to decrease, and the melt thermal stability, heat resistance, mechanical strength, and the like as the resin tend to decrease.

In the polyester resin (I) of the present invention, the recrystallization temperature obtained by DSC, observed when the resin is cooled from the molten state, is within a specific range. The recrystallization temperature observed when the resin is cooled from the molten state at −10° C./min is 160° C. or more, preferably 170° C. or more, more preferably 172° C. or more, and even more preferably 174° C. or more. By satisfying the above temperature conditions, it is possible to suppress the delay of the start of crystallization and to obtain sufficient crystallinity. The present invention can also suppress the formation of oligomers, whitening, and embrittlement after heat treatment.

The recrystallization temperature is 193° C. or less, preferably 190° C. or less, and more preferably 188° C. or less. By satisfying the above temperature conditions, the difference between the crystallization temperature and the melting temperature can be prevented from becoming too small, and excellent stretchability can be exhibited. When the recrystallization temperature is in the above range, the film formability is also good, and sufficient crystallinity can be obtained by heating for a short time, so that the film has a sufficient modulus of elasticity. The present invention can also suppress the formation of oligomers, whitening, and embrittlement after heat treatment.

In the present invention, in addition to the polyester resin (I) having a predetermined recrystallization temperature, the polyester resin (I) is contained in an amount of 60 mass % or more based on 100 mass % of the entire film. In an embodiment, the polyester resin (I) may be contained in an amount of 70 mass % or more, for example, 75 mass % or more, based on 100 mass % of the entire film. When the content of the polyester resin (I) is within the above range, it is possible to improve the modulus of elasticity and to avoid a decrease in film formability due to breakage. Furthermore, it is possible to suppress the generation of oligomers, whitening, and embrittlement after the heat treatment.

The polyester resin (I) may be contained in an amount of 100 mass % or less, for example, 98 mass % or less, and in an embodiment, 95 mass % or less, based on 100 mass % of the entire film. When the content of the polyester resin (I) is within the above range, it is possible to improve the modulus of elasticity and to avoid a decrease in film formability due to breakage. Furthermore, it is possible to suppress the generation of oligomers, whitening, and embrittlement after the heat treatment.

The polyester resin (I) of the present invention may be derived from petroleum or biomass. When a mixture of a petroleum-derived polyester resin and a polyester resin using a biomass-derived raw material is used, the degree of biomass is preferably 10% or more, and more preferably 13% or more, from the viewpoint of reducing the environmental burden. When the degree of biomass is within the above range, it is possible to exhibit an effect of reducing the environmental load.

The degree of biomass is preferably 100%, and may be, for example, 90% or less. In an embodiment, the degree of biomass is 13% or more and 30% or less, for example, 13% or more and 20% or less.

For example, polyethylene terephthalate theoretically has a degree of biomass of 20% when only ethylene glycol is derived from a plant. In order to achieve a degree of biomass of 20% or more, terephthalic acid also needs to be derived from a plant, which increases costs. The ratio of plant-derived carbon to the total number of carbon atoms measured according to ASTM D 6866 was defined as the degree of biomass. In the present invention, for example, ethylene glycol or terephthalic acid or an ester-forming derivative thereof is derived from a biomass resource.

The polyester resin (I) of the present invention may be a recycled polyester resin recycled from a plastic bottle. It is preferable to use a recycled polyester resin made from a plastic bottle containing an isophthalic acid component as an acid component. Crystallinity of polyesters used in plastic bottles is controlled in order to improve the appearance of the bottles. As a result, a polyester containing 10 mol % or less of an isophthalic acid component may be used. In order to make use of recycled resins, materials containing isophthalic acid components are used in some cases.

The amount of the terephthalic acid component in the total of the dicarboxylic acid components constituting the polyester resin contained in the film is preferably 95 mol % or more, more preferably 96 mol % or more, even more preferably 96.5 mol % or more, and particularly preferably 97 mol % or more. If the amount is less than 95 mol %, the crystallinity tends to decrease and the thermal shrinkage may increase, which is not preferable. On the other hand, the present invention can solve such a problem.

Further, the amount of the terephthalic acid component in the polyester resin contained in the film is preferably 99.5 mol % or less, and more preferably 99 mol % or less. Since many recycled polyester resins made from plastic bottles have dicarboxylic acid components other than terephthalic acid, typified by isophthalic acid, it is not preferable that the terephthalic acid component constituting the polyester resin in the film exceeds 99.5 mol % because it is difficult to produce a polyester film with a high ratio of recycled resin as a result. On the other hand, the present invention can solve such a problem.

The amount of the isophthalic acid component in the total of the dicarboxylic acid components constituting the polyester resin contained in the film is 0.5 mol % or more, preferably 0.7 mol % or more, more preferably 0.9 mol % or more, and particularly preferably 1 mol % or more.

Some recycled polyester resins made from plastic bottles contain a large amount of an isophthalic acid component. Therefore, it is not preferable that the isophthalic acid component constituting the polyester resin in the film is less than 0.5 mol %, because it is difficult to produce a polyester film with a high ratio of recycled resin as a result. On the other hand, the present invention can solve such a problem.

The amount of the isophthalic acid component in the total of the dicarboxylic acid components constituting the polyester resin contained in the film is preferably 5 mol % or less, more preferably 4 mol % or less, even more preferably 3.5 mol % or less, and particularly preferably 3 mol % or less. If the amount exceeds 5 mol %, the crystallinity decreases, which is not so preferable. On the other hand, the present invention can solve such a problem.

In addition, when the content of the isophthalic acid component is in the above range, it is easy to prepare a film excellent in laminate strength, shrinkage, and thickness unevenness, which is preferable.

The intrinsic viscosity of the recycled resin made from a plastic bottle is preferably 0.9 dl/g or less, more preferably 0.8 dl/g or less, even more preferably 0.77 dl/g or less, and particularly preferably 0.75 dl/g or less. If the intrinsic viscosity exceeds 0.9 dl/g, it is difficult to discharge the resin from the extruder, and the productivity may decrease, which is not preferable. On the other hand, the present invention can solve such a problem.

In order to obtain slipperiness of the film, it is preferable to add a lubricant to the raw material. Preferable examples of the lubricant include inorganic lubricants, such as silica, calcium carbonate, and alumina, as well as organic lubricants; and more preferably silica and calcium carbonate. These inorganic particles may be used singly or in combination of two or more. These particles can be incorporated into the film by being added to the polyester resin in advance. The polyester resin to which the particles are added may be used for the entire film; however, higher transparency can be maintained by using the polyester resin only for the surface layer. The lubricant-added layer may be provided only on one surface or may be provided on both surfaces. In order to achieve both slipperiness and transparency, the thickness of the surface layer is preferably in the range of 1 to 30% with respect to the thickness of the entire film. Due to the above, transparency and slipperiness can be exhibited.

The lower limit of the concentration of the lubricant in the film is preferably 10 ppm, more preferably 30 ppm, and even more preferably 50 ppm. If the concentration is less than the above range, the practicality may decrease in terms of slipperiness. The upper limit of the lubricant concentration is preferably 10000 ppm, more preferably 9000 ppm, and even more preferably 8000 ppm. If the concentration exceeds the above range, the transparency may decrease. On the other hand, the present invention can solve such a problem.

Regarding the particle size of the lubricant in the film, the lower limit of the primary particle size is 0.005 μm, preferably 0.010 μm, and even more preferably 0.015 μm. If the particle size is less than 0.005 μm, the viscosity increases during melting, which is not preferable. Regarding the particle size of the lubricant, the upper limit of the primary particle size is 50 μm, preferably 40 μm, and more preferably 30 μm. If the particle size exceeds 50 μm, a decrease in transparency or detachment is observed, which is not preferable. On the other hand, the present invention can solve such a problem.

In the present invention, the melt resistivity of the polyester film at a temperature of 285° C. is preferably $1.0 \times 10^8$ Ω·cm or less. The polyester-based resin composition used for this purpose is preferably adjusted so that the melt resistivity at 285° C. as measured by a measurement method described later is $1.0 \times 10^8$ Ω·cm or less, preferably $0.5 \times 10^8$ Ω·cm, and more preferably $0.25 \times 10^8$ Ω·cm. If adhesion to a cooling drum is attempted under the production conditions in which abnormal discharge is avoided by using only a polyester-based resin having a melt resistivity at 285° C. exceeding $1.0 \times 10^8$ Ω·cm, the molten resin sheet is cooled in a state in which air is locally caught between the sheet and the cooling drum, and pinner bubbles are thus generated on the sheet surface, which is not preferable. In order to suppress the generation of pinner bubbles, it is necessary to reduce the production speed to such an extent that the discharged molten resin can sufficiently adhere to the cooling drum, which increases production costs. The lower limit is not particularly defined, but is preferably $0.01 \times 10^8$ Ω·cm or more, in consideration of the color tone and the like.

In the polyester-based resin used in the present invention, in order to control the melt resistivity within the above range, an alkaline earth metal compound and a phosphorus compound may be incorporated into the resin. As the method of introducing these compounds, a polyester-based resin containing the alkaline earth metal compound and the phosphorus compound may be mixed with a polyester recycled from a plastic bottle. The alkaline earth metal atom (M2) in the alkaline earth metal compound has an effect of reducing the melt resistivity of the resin. Alkaline earth metal compounds are generally used as catalysts when esters are produced from polyvalent carboxylic acids and polyhydric alcohols. When an alkaline earth metal compound is actively added in an amount equal to or more than a necessary amount as a catalyst, the effect of reducing melt resistivity can be exhibited. Specifically, it is recommended that the content of the alkaline earth metal compound is preferably 20 ppm (based on mass; the same applies hereinafter) or more, more preferably 22 ppm or more, and particularly preferably 24 ppm or more, on a M2 basis. On the other hand, it is recommended that the content of the alkaline earth metal compound is 400 ppm or less, preferably 350 ppm or less, and more preferably 300 ppm or less, on a M2 basis. Even if the alkaline earth metal compound is used in excess of this amount, an effect commensurate with the amount cannot be obtained. Rather, it is not so preferable because harmful effects such as the generation of foreign matter and coloring due to this compound increase.

Specific examples of preferred alkaline earth metal compounds include hydroxides of alkaline earth metals, aliphatic dicarboxylic acid salts (acetate, butyrate, etc., preferably acetate), aromatic dicarboxylic acid salts, salts with compounds having a phenolic hydroxyl group (e.g., salts with phenols), and the like. Examples of alkaline earth metals include magnesium, calcium, strontium, and barium (preferably magnesium). More specific examples include magnesium hydroxide, magnesium acetate, calcium acetate, strontium acetate, barium acetate, and the like. Of these, magnesium acetate is preferably used. These alkaline earth metal compounds may be used singly or in combination of two or more. Although there seems to be a definition in which magnesium is not included in alkaline earth metals in recent years, the present invention is intended for alkaline earth metals of the conventional definition including magnesium. In other words, elements of Group IIa of the periodic table are intended.

The phosphorus compound itself does not have an effect of reducing the melt resistivity of the film, but can contribute to a reduction in the melt resistivity when combined with the alkaline earth metal compound and an alkali metal compound described later. Although the reason for this is not clear, it is considered that the generation of foreign matter can be suppressed and the amount of charge carriers can be increased by incorporating the phosphorus compound. It is recommended that the content of the phosphorus compound is preferably 10 ppm (based on mass; the same applies hereinafter) or more, more preferably 11 ppm or more, and particularly preferably 12 ppm or more, on a phosphorus atom (P) basis. If the content of the phosphorus compound is less than the above range, the effect of reducing the melt resistivity is insufficient. Further, the amount of foreign matter generated tends to increase, which is not so preferable.

On the other hand, it is recommended that the content of the phosphorus compound is preferably 600 ppm or less, more preferably 550 ppm or less, and particularly preferably 500 ppm or less, on a P basis. Even if the phosphorus compound is used in excess of this amount, an effect commensurate with the amount cannot be obtained, and the effect of reducing the melt resistivity is saturated. Further, it is not so preferable because it promotes the production of diethylene glycol and causes deterioration in the physical properties of the film.

Examples of the phosphorus compound include phosphoric acids (phosphoric acid, phosphorous acid, hypophosphorous acid, etc.) and esters thereof (alkyl esters, aryl esters, etc.), as well as alkylphosphonic acids, arylphosphonic acids, and esters thereof (alkyl esters, aryl esters, etc.). Preferred phosphorus compounds include phosphoric acid, aliphatic esters of phosphoric acid (alkyl esters of phosphoric acid: e.g., phosphoric acid mono-C1-6 alkyl esters, such as monomethyl phosphate, monoethyl phosphate, and monobutyl phosphate; phosphoric acid di-C1-6 alkyl esters, such as dimethyl phosphate, diethyl phosphate, and dibutyl phosphate; and phosphoric acid tri-C1-6 alkyl esters, such as trimethyl phosphate, triethyl phosphate, and tributyl phosphate), aromatic esters of phosphoric acid (mono-, di-, or tri-C6-9 aryl esters of phosphoric acid, such as triphenyl phosphate and tricresyl phosphate), aliphatic esters of phosphorous acid (alkyl esters of phosphorous acid: e.g., mono-, di-, or tri-C1-6 alkyl esters of phosphorous acid, such as trimethyl phosphite and tributyl phosphite), alkylphosphonic acids (C1-6 alkylphosphonic acids, such as methylphosphonic acid and ethylphosphonic acid), alkylphosphonic acid alkyl esters (mono- or di-C1-6 alkyl esters of C1-6 alkylphosphonic acid, such as dimethyl methylphosphonate and dimethyl ethylphosphonate), arylphosphonic acid alkyl esters (mono- or di-C1-6 alkyl esters of C6-9 arylphosphonic acid, such as dimethyl phenylphosphonate and diethyl phenylphosphonate), arylphosphonic acid aryl esters (mono- or di-C6-9 aryl esters of C6-9 arylphosphonic acid, such as diphenyl phenylphosphonate), and the like. Particularly preferred phosphorus compounds include phosphoric acid and trialkyl phosphates (e.g., trimethyl phosphate). These phosphorus compounds can be used singly or in combination of two or more.

Furthermore, the alkaline earth metal compound and the phosphorus compound are preferably contained in the film so that the mass ratio (M2/P) of alkaline earth metal atom (M2) to phosphorus atom (P) is 1.2 or more and 5.0 or less.

If the M2/P value is 1.2 or less, the effect of reducing the melt resistivity is significantly reduced. This value is more preferably 1.3 or more, and even more preferably 1.4 or more. On the other hand, if the M2/P value exceeds 5.0, adverse effects such as promotion of the generation of foreign matter and coloring of the film become larger than the effect of reducing the melt resistivity, which is not preferable. This value is more preferably 4.5 or less, and even more preferably 4.0 or less.

In addition, the polyester film of the present invention may be provided with a coating layer on at least one surface thereof in order to improve the coating properties and/or adhesiveness of a printing ink and/or a coating agent. The compound constituting the coating layer is preferably a polyester-based resin. In addition, a compound disclosed as a means (easy-to-adhere layer) for improving the adhesiveness of an ordinary polyester-based film, such as a polyurethane resin, a polyester urethane resin, an acrylic resin, or a polyether-based resin, can be applied. Further, a crosslinked structure may be formed in order to improve the adhesion durability of such an easy-to-adhere layer. By incorporating a crosslinking agent, it is possible to further enhance the adhesiveness under high temperature and high humidity. Specific examples of crosslinking agents include urea-based crosslinking agents, epoxy-based crosslinking agents, melamine-based crosslinking agents, isocyanate-based crosslinking agents, oxazoline-based crosslinking agents, carbodiimide-based crosslinking agents, and the like. In addition, in order to promote the crosslinking reaction, a catalyst or the like can be appropriately used as necessary.

The coating layer may contain lubricant particles in order to impart slipperiness, matting properties, ink absorbency, and the like to the surface. The particles may be inorganic particles or organic particles, and are not particularly limited. Examples include (1) inorganic particles, such as silica, kaolinite, talc, light calcium carbonate, heavy calcium carbonate, zeolite, alumina, barium sulfate, carbon black, zinc oxide, zinc sulfate, zinc carbonate, zirconium oxide, titanium dioxide, aluminum silicate, diatomaceous earth, calcium silicate, aluminum hydroxide, calcium carbonate, magnesium carbonate, calcium phosphate, magnesium hydroxide, and barium sulfate; and (2) organic particles, such as acrylic or methacrylic, vinyl chloride, vinyl acetate, nylon, styrene/acrylic, styrene/butadiene, polystyrene/acrylic, polystyrene/isoprene, polystyrene/isoprene, methyl methacrylate/butyl methacrylate, melamine, polycarbonate, urea, epoxy, urethane, phenol, diallyl phthalate, and polyester particles. Silica is particularly preferably used in order to impart appropriate slipperiness to the coating layer.

As the method for providing the coating layer, a commonly used method, such as gravure coating, kiss coating, dipping, spray coating, curtain coating, air knife coating, blade coating, or reverse roll coating, can be applied. As the coating step, a method of coating before stretching the film, a method of coating after longitudinal stretching, a method of coating on the surface of the film after stretching treatment, or the like can be used.

Next, the method for forming the polyester film of the present invention is described, but is not particularly limited thereto. For example, a mixture composed of the above composition is dried by a conventional method, and melted and extruded into a sheet form from a T-shaped die, and the sheet is brought into close contact with a casting drum by electrostatic application or the like for cooling and solidification, thereby obtaining an unstretched film. Then, the unstretched film is subjected to stretching and orientation treatment. The following describes, as an example, the most commonly used sequential biaxial stretching method, in particular, a method in which the unstretched film is longitudinally stretched in the longitudinal direction and then laterally stretched in the width direction. First, in the longitudinal stretching step in the longitudinal direction, the film is heated and stretched 1.0 to 5.0 times between 2 or a large number of rolls having different peripheral speeds. The heating means used herein may be a method using a heating roll or a method using a non-contact heating medium, which may be used in combination. It is preferable to set the temperature of the film in the range of (Tg−10° C.) to (Tg+50° C.)

Next, the uniaxially stretched film is introduced into a tenter and stretched 1.0 to 6.0 times in the width direction at a temperature of (Tg−10° C.) to Tm−10° C. or less, whereby a biaxially stretched film is obtained. Tg is the glass transition temperature of the polyester-based resin, and Tm is the melting point of the polyester. The film thus obtained is preferably subjected to heat treatment as necessary, and the treatment temperature is preferably in the range of (Tm−60° C.) to Tm.

Characteristics of Film

The total tensile modulus of elasticity of the biaxially stretched polyester film of the present invention in the longitudinal direction and the width direction is 7000 MPa or more, preferably 7200 MPa or more, and more preferably 7500 MPa or more. In an embodiment, the total tensile modulus of elasticity of the biaxially stretched polyester film in the longitudinal direction and the width direction is 12000 MPa or less, for example, 11000 MPa or less.

Further, the tensile modulus of elasticity of the biaxially stretched polyester film is 3200 MPa or more, for example, 3300 MPa or more, and may be 3400 MPa or more, in both the longitudinal direction and the width direction. In an embodiment, the tensile modulus of elasticity of the biaxially stretched polyester film may be 3500 MPa or more, and preferably 3700 MPa or more, in both the longitudinal direction and the width direction. As a result, the resulting film is isotropic, does not limit the direction of use, has stiffness, has little deflection during conveyance, and is suitable for processing.

In an embodiment, the tensile modulus of elasticity of the biaxially stretched polyester film in at least one of the longitudinal direction and the width direction is 4000 MPa or more, for example, 4200 MPa or more, and may be 4300 MPa or more. As a result, the stiffness can be further improved, and the film has less deflection during conveyance and is more suitable for processing.

According to the present invention, since the film containing the polyester resin A according to the present invention has such a tensile modulus of elasticity, the present invention can have an effect of improving the modulus of elasticity and avoiding a decrease in film formability due to breakage, which have been conventionally difficult, in a well-balanced manner. In addition, the present invention can prevent the anisotropy from becoming very large.

The modulus of elasticity can be effectively adjusted by the draw ratio and crystallinity. For example, when the polyester resin (I) according to the present invention is contained, the draw ratio in both the longitudinal direction and the width direction is preferably 2.0 times or more and 5.5 times or less, more preferably 2.8 times or more and 5.5 times or less, even more preferably 2.9 times or more and 5.2 times or less, and still more preferably 3.0 times or more and 5.0 times or less. Within the above range, a sufficient modulus of elasticity can be obtained, and good film formability can be achieved. In order to obtain a biaxially stretched polyester film with 3200 MPa or more in both the longitudinal direction and the width direction, the draw ratio in the width direction with respect to the draw ratio in the longitudinal direction is preferably 1.0 or more and 1.8 or less.

The crystallinity is preferably 30% or more, more preferably 35% or more, and even more preferably 40% or more. This can be achieved when the recrystallization temperature is in the above range.

The biaxially stretched polyester film of the present invention may have any thickness; however, the thickness is preferably 5 μm or more and 500 μm or less, and more preferably 30 μm or more and 300 μm or less. Within the above range, it is possible to avoid a decrease in workability. It is also possible to suppress crease marks, thickness unevenness, and the like, and it is possible to obtain a good appearance.

The haze of the biaxially stretched polyester film of the present invention is preferably 5 or less, more preferably 4 or less, and even more preferably 3 or less. For example, the haze is 0.2 or more, and may be 0.5 or less.

The total light transmittance is preferably 80% or more, more preferably 85% or more, and even more preferably 88% or more. Outside the above range, the transparency tends to decrease.

In another embodiment, the present invention provides a biaxially stretched polyester film having an easy-to-adhere layer on at least one surface of the above biaxially stretched polyester film.

In an embodiment, the present invention provides a label film having an adhesive layer on at least one surface of the biaxially stretched polyester film.

In an embodiment, the present invention provides a biaxially stretched polyester film having a coating layer of a UV curing resin on at least one surface of the biaxially stretched polyester film.

The easy-to-adhere layer, the adhesive layer, and the coating layer of a UV curing resin may be known layers.

In another embodiment, the present invention provides a diffusion film for display having the biaxially stretched polyester film.

In another embodiment, the present invention provides a lens film for display having the biaxially stretched polyester film.

EXAMPLES

Next, the present invention is described in more detail with reference to Examples; however, the present invention is not limited to the following Examples. Films were evaluated by the following measurement methods.

Melting Point of Polyester and Recrystallization Temperature

The measurements were performed using a differential scanning calorimeter (DSC) produced by SII with a sample amount of 10 mg at a temperature increase/decrease rate of 20° C./min. The melting endothermic peak detected here was defined as the melting point, and the exothermic peak detected when the temperature was decreased was defined as the recrystallization temperature.

Thickness

The thickness was measured at three points with four significant digits using a micrometer, and the average value was rounded to three significant digits to obtain the average thickness (μm).

Tensile Modulus of Elasticity

The tensile modulus of elasticity was measured according to JIS K 7113. A sample having a width of 10 mm and a length of 180 mm in the longitudinal direction and the width direction of a film was cut out using a razor and used as a sample. The measurements were performed under the conditions of an inter-chuck distance of 100 mm and a pulling speed of 200 mm/min, and the average value of three measurements was used. Autograph AG 5000 A produced by Shimadzu Corporation was used as a measurement device.

Haze and Total Light Transmittance

The haze and total light transmittance were measured with a haze meter (NDH5000, produced by Nippon Denshoku Industries Co., Ltd.).

Degree of Biomass

The ratio of plant-derived carbon to the total number of carbon atoms measured according to ASTM D 6866 was defined as the degree of biomass.

Ink Adhesion

According to the grid evaluation described in JIS-K 5400, ink was printed on the easy-to-adhere surface of a film, 100 1-mm squares were then formed with a utility knife blade using a cross-cut guide, and the adhesion of the squares was then evaluated using adhesive tape (cellophane tape, produced by Nichiban Corporation).

Evaluation Results

A: 80 to 100 squares with ink remained.

B: 60 to 79 squares with ink remained.

C: Less than 60 squares with ink remained.

Evaluation of Thickness Unevenness

The continuous thickness of a 1-m film was measured, the maximum thickness was defined as Tmax, the minimum thickness was defined as Tmin, and the average thickness was defined as Tave. The thickness unevenness was determined by the following formula:

$$\text{Thickness unevenness} = \{(T\text{max} - T\text{min})/T\text{ave}\} \times 100 \ (\%)$$

Evaluation Results

A: Thickness unevenness: less than 12%

B: Thickness unevenness: 12% or more and less than 20%

C: Thickness unevenness: 20% or more

Production Example of Polyester Resin A

Magnesium acetate tetrahydrate was added to a mixture of terephthalic acid purified from a petroleum-derived raw material and ethylene glycol purified from a plant-derived raw material in an amount of 70 ppm on a Mg atom basis in the polyester, and the resulting mixture was subjected to an esterification reaction at a temperature of 255° C. under ordinary pressure. Thereafter, antimony trioxide in an amount of 280 ppm on an Sb atom basis in the polyester and trimethyl phosphate in an amount of 40 ppm on a P atom basis in the polyester were added, and the reaction was further performed at a temperature of 260° C.

Subsequently, the reaction product was transferred to a polycondensation reaction tank, the reaction system was gradually decompressed while heating and raising the temperature, and polycondensation was carried out at 280° C. at a reduced pressure of 133 Pa (1 mmHg) by a conventional method, thereby obtaining a polyester chip of IV=0.62. This is referred to as polyester A. The recrystallization temperature was 180° C. When the degree of biomass of the polyester A was measured according to ASTM D 6866, the degree of biomass was 17%.

Production Example of Polyester Resin B

The esterification reactor for use was a continuous esterification reactor composed of a three-stage complete mixing tank equipped with a stirrer, a partial condenser, a raw material inlet, and a product outlet. Slurry of TPA in an amount of 2 tons/hr, 2 mol of EG per mol of TPA, and antimony trioxide in an amount of 160 ppm on an Sb atom basis relative to a produced PET was continuously supplied to the first esterification reaction vessel of the esterification reactor, and allowed to react at 255° C. under ordinary pressure with an average residence time of 4 hours.

Subsequently, the reaction product in the first esterification reaction vessel was continuously taken out of the system and supplied to the second esterification reaction vessel. EG distilled from the first esterification reaction vessel in an amount of 8 mass % of the produced polymer (produced PET) was then supplied to the second esterification reaction vessel, and an EG solution containing magnesium acetate in an amount of 65 ppm on a Mg atom basis relative to the produced PET, and an EG solution containing TMPA in an amount of 20 ppm on a P atom basis relative to the produced PET, were further added thereto, followed by a reaction at 260° C. under ordinary pressure with an average residence time of 1.5 hours. Subsequently, the reaction product in the second esterification reaction vessel was continuously taken out of the system and supplied to the third esterification reaction vessel, and an EG solution containing TMPA in an amount of 20 ppm on a P atom basis relative to the produced PET was further added thereto, followed by a reaction at 260° C. under ordinary pressure with an average residence time of 0.5 hours. The esterification reaction product generated in the third esterification reaction vessel was continuously supplied to a three-stage continuous polycondensation reactor to perform polycondensation, and filtered through a sintered stainless-steel filter material (nominal filtration accuracy: 5-μm particles are 90% cut), thereby obtaining a polyethylene terephthalate resin. This is referred to as polyester B. The recrystallization temperature was 165° C.

Production Example of Polyester Resin C

Flakes obtained by pulverization after washing away foreign matter, such as any remaining beverage, from a plastic bottle for beverages were melted in an extruder, and finer foreign matter was further filtered out twice while sequentially changing the filter to a one having a finer opening size, and filtered out by the third filtration using a filter having the smallest opening size of 50 μm, thereby obtaining a recycled polyester raw material. This is referred to as polyester C. The recrystallization temperature was 192° C.

Production Example of Polyester Resin D

Polymerization was carried out in the same manner as for the polyester resin B using 100 mol % of terephthalic acid units as aromatic dicarboxylic acid components and 40 mol % of ethylene glycol units and 60 mol % of neopentyl glycol units as diol components. This is referred to as polyester D. No recrystallization peak was observed from the molten state to 160° C.

Production Example of Polyester Resin E

Polybutylene terephthalate resin 1100-211XG (Chang Chun Plastics Co., Ltd., intrinsic viscosity: 1.28 dl/g) was used. This is referred to as polyester E. The recrystallization temperature was 196° C.

Production Example of Polyester Resin F

When the temperature of an esterification reaction vessel was raised to reach 200° C., a slurry composed of 86.4 parts by mass of terephthalic acid and 64.4 parts by mass of ethylene glycol was placed in the vessel, and 0.025 parts by mass of antimony trioxide and 0.16 parts by mass of triethylamine were added as catalysts while stirring. Next, the temperature was raised by heating, and a pressurized esterification reaction was performed at a gauge pressure of 0.34 MPa at 240° C. Thereafter, the pressure in the esterification reaction vessel was returned to ordinary pressure, and 0.34 parts by mass of magnesium acetate tetrahydrate and then 0.042 parts by mass of trimethyl phosphate were added. Further, after the temperature was raised to 260° C. over 15 minutes, 0.036 parts by mass of trimethyl phosphate and then 0.0036 parts by mass of sodium acetate were added. The obtained esterification reaction product was transferred to a polycondensation reaction vessel, and the temperature was gradually raised from 260° C. to 280° C. under reduced pressure. Then, a polycondensation reaction was performed at 285° C. After completion of the polycondensation reaction, filtration treatment was performed with a sintered stainless-steel filter having a pore size of 5 μm (initial filtration efficiency: 95%), and the obtained polycondensation reaction product was pelletized. This is referred to as polyester F.

Production Example of Lubricant Masterbatch

As a lubricant masterbatch, a masterbatch containing 0.3% of amorphous silica having an average particle size of 1.5 μm in the polyester resin C was prepared.
Production of Films

Example 1

The raw material of a polyester a layer was polyester resin A/F=95.0/5.0 parts by mass, and the raw material of a polyester b layer was polyester resin A/F/lubricant masterbatch=90.8/5.0/4.2 parts by mass.

These raw materials were supplied to different extruders and melted at 280° C. The polyester a layer and the polyester b layer were laminated in the order of b/a/b, joined using a feed block so that the thickness ratio thereof was 8.5/83/8.5, then extruded from a T die onto a cooling drum adjusted to 30° C., and electrostatically attached, thereby producing an unstretched film having a two-type three-layer structure.

The unstretched film a was uniformly heated to 80° C. using a heating roll and longitudinally stretched 3.4 times between 2 pairs of nip rolls having different peripheral speeds. At this time, as an auxiliary heating device for the film, an infrared heating heater equipped with a gold reflective film was installed at an intermediate portion of the nip rolls and heated. The thus-obtained uniaxially stretched film was guided to a tenter, heated at 160° C., and laterally stretched 4.0 times. With the width fixed, the film was subjected to heat fixation at 250° C., and further relaxed by 2.3% in the width direction at 210° C., thereby obtaining a polyester film with a thickness of 50 μm. The film formability was good, and the modulus of elasticity, the haze, and the like were also good. Table 1 shows various conditions and evaluation results.

Example 2

A polyester film with a thickness of 50 μm was obtained in the same manner as in Example 1, except that the raw material of the polyester b layer was polyester resin A/F=95.0/5.0 parts by mass. Table 1 also shows various conditions and evaluation results.

Example 3

A polyester film with a thickness of 50 μm was obtained in the same manner as in Example 1, except that the draw ratio in the longitudinal direction was set to 3.0 times.

Example 4

A polyester film with a thickness of 50 μm was obtained in the same manner as in Example 1, except that the draw ratio in the longitudinal direction was set to 2.8 times.

Example 5

A polyester film with a thickness of 50 μm was obtained in the same manner as in Example 4, except that the draw ratio in the width direction was set to 4.5 times.

Example 6

A polyester film with a thickness of 50 μm was obtained in the same manner as in Example 1, except that the raw material of the polyester a layer was polyester resin B=100 parts by mass, and the raw material of the polyester b layer was polyester resin B/lubricant masterbatch=95.8/4.2 parts by mass.

Example 7

A polyester film with a thickness of 50 μm was obtained in the same manner as in Example 1, except that the raw material of the polyester a layer was polyester resin C/F=95.0/5.0 parts by mass, and the raw material of the polyester b layer was polyester resin C/F/lubricant masterbatch=90.8/5.0/4.2 parts by mass.

16

Example 8

A polyester film with a thickness of 50 μm was obtained in the same manner as in Example 7, except that the raw material of the polyester b layer was polyester resin C/F=95.0/5.0 parts by mass.

Example 9

A polyester film with a thickness of 50 μm was obtained in the same manner as in Example 1, using 100 parts by mass of the polyester resin A as raw materials for both the polyester a layer and the polyester b layer.

Comparative Example 1

A polyester film with a thickness of 50 μm was obtained in the same manner as in Example 1, except that the draw ratio in the longitudinal direction was set to 1.0 times. Table 1 shows various conditions and evaluation results.

Comparative Example 2

A polyester film with a thickness of 50 μm was obtained in the same manner as in Example 6, except that the draw ratio in the longitudinal direction was set to 1.0 times.

Comparative Example 3

A polyester film with a thickness of 50 μm was obtained in the same manner as in Example 1, except that the raw material of the polyester a layer was polyester resin B/D=50.0/50.0 parts by mass, and the raw material of the polyester b layer was polyester resin B/D/lubricant masterbatch=45.8/50.0/4.2 parts by mass.

Comparative Example 4

A polyester film with a thickness of 50 μm was obtained in the same manner as in Example 1, except that the raw material of the polyester a layer was polyester resin B/E=50.0/50.0 parts by mass, and the raw material of the polyester b layer was polyester resin B/E/lubricant masterbatch=55.8/40.0/4.2 parts by mass.

TABLE 1

| | Polyester a layer raw material | | | | | | Polyester b layer raw material | | | | | | Lubricant MB |
|---|---|---|---|---|---|---|---|---|---|---|---|---|---|
| | Resin A | Resin B | Resin C | Resin D | Resin E | Resin F | Resin A | Resin B | Resin C | Resin D | Resin E | Resin F | |
| Ex. 1 | 95.0 | | | | | 5.0 | 90.8 | | | | | 5.0 | 4.2 |
| Ex. 2 | 95.0 | | | | | 5.0 | 95.0 | | | | | 5.0 | 0.0 |
| Ex. 3 | 95.0 | | | | | 5.0 | 90.8 | | | | | 5.0 | 4.2 |
| Ex. 4 | 95.0 | | | | | 5.0 | 90.8 | | | | | 5.0 | 4.2 |
| Ex. 5 | 95.0 | | | | | 5.0 | 90.8 | | | | | 5.0 | 4.2 |
| Ex. 6 | | 100.0 | | | | 0.0 | | 95.8 | | | | 0.0 | 4.2 |
| Ex. 7 | | | 95.0 | | | 5.0 | | | 90.8 | | | 5.0 | 4.2 |
| Ex. 8 | | | 95.0 | | | 5.0 | | | 95.0 | | | 5.0 | 0.0 |
| Ex. 9 | 100.0 | | | | | 0.0 | 100.0 | | | | | 0.0 | 0.0 |
| Comp. Ex. 1 | 95.0 | | | | | 5.0 | 90.8 | | | | | 5.0 | 4.2 |
| Comp. Ex. 2 | | 100.0 | | | | 0.0 | | 95.8 | | | | 0.0 | 4.2 |
| Comp. Ex. 3 | | 50.0 | | 50.0 | | | | 45.8 | | 50.0 | | | 4.2 |
| Comp. Ex. 4 | | 50.0 | | | 50.0 | | | 55.8 | | | 40.0 | | 4.2 |

TABLE 1-continued

| | Film-forming conditions | | | | Tensile modulus of | | |
| | | | | Thick- | elasticity | | |
| | Longi-tudinal direction | Width direc-tion | Relax (%) | ness un-evenness | Longitudinal direction (Mpa) | Width direction (MPa) | Degree of biomass |
|---|---|---|---|---|---|---|---|
| Ex. 1 | 3.4 | 4.0 | 2.3 | A | 4100 | 5100 | 17.0 |
| Ex. 2 | 3.4 | 4.0 | 2.3 | A | 4000 | 5100 | 17.1 |
| Ex. 3 | 3.0 | 4.0 | 2.3 | A | 3700 | 5000 | 17.0 |
| Ex. 4 | 2.8 | 4.0 | 2.3 | A | 3400 | 4800 | 17.0 |
| Ex. 5 | 2.8 | 4.5 | 2.3 | A | 3300 | 5100 | 17.0 |
| Ex. 6 | 3.4 | 4.0 | 2.3 | B | 3400 | 3800 | 0.0 |
| Ex. 7 | 3.4 | 4.0 | 2.3 | A | 4200 | 4700 | 0.0 |
| Ex. 8 | 3.4 | 4.0 | 2.3 | A | 4000 | 4600 | 0.0 |
| Ex. 9 | 3.4 | 4.0 | 2.3 | B | 4100 | 5200 | 20.0 |
| Comp. Ex. 1 | 1.0 | 4.0 | 2.3 | A | 2800 | 7500 | 17.0 |
| Comp. Ex. 2 | 1.0 | 4.0 | 2.3 | A | 2500 | 7400 | 0.0 |
| Comp. Ex. 3 | 3.4 | 4.0 | 2.3 | A | 2500 | 3200 | 0.0 |
| Comp. Ex. 4 | 3.4 | 4.0 | 2.3 | A | 2600 | 4000 | 0.0 |

| | Optical characteristics | | |
| | Total light transmittance (%) | Haze | Ink adhesion |
|---|---|---|---|
| Ex. 1 | 90.8 | 1.9 | A |
| Ex. 2 | 90.6 | 0.9 | A |
| Ex. 3 | 90.8 | 2.0 | A |
| Ex. 4 | 90.5 | 1.8 | A |
| Ex. 5 | 90.5 | 1.9 | A |
| Ex. 6 | 92.4 | 1.6 | A |
| Ex. 7 | 89.3 | 2.5 | A |
| Ex. 8 | 89.5 | 1.6 | A |
| Ex. 9 | 90.7 | 0.9 | A |
| Comp. Ex. 1 | 90.9 | 2.0 | A |
| Comp. Ex. 2 | 91.8 | 1.5 | A |
| Comp. Ex. 3 | 90.3 | 0.9 | A |
| Comp. Ex. 4 | 90.2 | 1.0 | A |

As shown in the above table, the films obtained in Examples 1 to 8 had good film formability, good thickness unevenness, excellent transparency, and a sufficient modulus of elasticity. According to the present invention, it is possible to obtain a polyester film that is more excellent in stiffness and transparency than conventional polyester films, and that is suitable for producing molded articles, labels, optical films, and the like.

More specifically, the modulus of elasticity, which is important in mechanical characteristics, could be improved. In addition, the present invention was able to achieve an effect of improving the modulus of elasticity and avoiding a decrease in film formability due to breakage in a well-balanced manner. Further, the present invention was able to suppress the anisotropy from becoming very large, and to suppress the formation of oligomers, whitening, and embrittlement after heat treatment.

On the other hand, the films of Comparative Examples 1 and 2 had stable film formability, but were highly anisotropic. The films of Comparative Examples 1 and 2 had an insufficient modulus of elasticity in the longitudinal direction, and did not satisfy the condition of the present invention that the tensile modulus of elasticity in both the longitudinal direction and the width direction be 3200 MPa or more.

In Comparative Examples 3 and 4, since a resin having a recrystallization temperature within the range of the present invention was contained in an amount of less than 60%, sufficient stress was not generated in the stretching step, and the films were not sufficiently crystallized by heat fixation, thus failing to obtain films having a sufficient modulus of elasticity.

INDUSTRIAL APPLICABILITY

According to the present invention, it is possible to obtain a polyester film that is more excellent in stiffness and transparency than conventional polyester films, and that is suitable for producing molded articles, labels, optical films, and the like.

The invention claimed is:

1. A biaxially stretched polyester film comprising a polyester A layer and a polyester B layer, wherein
   the polyester A layer comprises a polyester resin (I) and a polyester resin (II),

the polyester B layer comprises the polyester resin (I) and the polyester resin (II), the polyester resin (I) comprises (a) terephthalic acid or an ester-forming derivative thereof and (b) ethylene glycol as main constituent components, wherein the terephthalic acid or an ester-forming derivative thereof or the ethylene glycol is derived from a biomass resource, the polyester resin (I) has a degree of biomass measured according to ASTM D6866 of 10% or more, the polyester resin (I) has a recrystallization temperature obtained by DSC of 160° C. or more and 193° C. or less when the polyester resin (I) is cooled from the molten state at −10° C./min, the polyester resin (II) has a recrystallization temperature obtained by DSC when the polyester resin (II) is cooled from the molten state at −10° C./min that differs from the recrystallization temperature of the polyester (I), the polyester resin (I) is contained in an amount of 60 mass % or more based on 100 mass % of the entire film, the film has a tensile modulus of elasticity in a longitudinal direction of 3200 MPa or more and a tensile modulus of elasticity in a width direction of 3200 MPa or more, and the tensile modulus of elasticity in the longitudinal direction and the tensile modulus of elasticity in the width direction provide a sum total tensile modulus of elasticity of 7000 MPa or more.

2. A biaxially stretched polyester film having an easy-to-adhere layer on at least one surface of the biaxially stretched polyester film according to claim 1.

3. A biaxially stretched polyester film having a coating layer of a UV curing resin on at least one surface of the biaxially stretched polyester film according to claim 2.

4. A biaxially stretched polyester film having a coating layer of a UV curing resin on at least one surface of the biaxially stretched polyester film according to claim 1.

5. The biaxially stretched polyester film according to claim 1, wherein the film has a crystallinity of 30% or more, a thickness of 5 μm or more and 500 μm or less, a haze of 5 or less, and a total light transmittance of 80% or more.

6. A label film having an adhesive layer on at least one surface of the biaxially stretched polyester film according to claim 1.

7. A label film having an adhesive layer on at least one surface of the biaxially stretched polyester film according to claim 2.

8. A diffusion film for a display having the biaxially stretched polyester film according to claim 1.

9. A diffusion film for a display having the biaxially stretched polyester film according to claim 2.

10. A diffusion film for a display having the biaxially stretched polyester film according to claim 4.

11. A lens film for a display having the biaxially stretched polyester film according to claim 1.

12. A lens film for a display having the biaxially stretched polyester film according to claim 2.

13. A lens film for a display having the biaxially stretched polyester film according to claim 4.

* * * * *